United States Patent [19]

Rado

[11] Patent Number: 4,578,090

[45] Date of Patent: Mar. 25, 1986

[54] METHOD FOR PROCESSING GASEOUS EFFLUENT STREAMS RECOVERED FROM THE VAPOR PHASE OXIDATION OF METAL HALIDES

[75] Inventor: Theodore A. Rado, Oklahoma City, Okla.

[73] Assignee: Kerr-McGee Chemical Corporation, Oklahoma City, Okla.

[21] Appl. No.: 660,875

[22] Filed: Oct. 15, 1984

[51] Int. Cl.$^4$ .............................................. B01D 47/05
[52] U.S. Cl. ...................................... 55/48; 55/49; 55/51; 55/71; 423/613
[58] Field of Search ................... 55/48, 49, 51, 71, 89; 423/240, 241, 500, 612, 613

[56] References Cited

U.S. PATENT DOCUMENTS

| 2,508,271 | 5/1950 | Krchma | 423/613 |
|---|---|---|---|
| 2,849,083 | 8/1958 | Nelson et al. | 55/71 X |
| 2,870,869 | 1/1959 | Mahler | 55/71 X |
| 2,889,687 | 6/1959 | Ishizuka | 55/71 X |
| 3,009,541 | 11/1961 | Mas et al. | 55/71 X |
| 3,120,427 | 2/1964 | Mas et al. | 423/613 |
| 3,493,342 | 2/1970 | Weaver et al. | 55/71 X |
| 3,526,477 | 9/1970 | Wan | 423/613 X |
| 3,647,383 | 3/1972 | Farmer et al. | 423/613 |
| 3,650,695 | 3/1972 | Bogdan | 55/71 X |
| 3,681,895 | 8/1972 | Zirngibl et al. | 55/71 |
| 3,690,041 | 9/1972 | Low | 55/71 |
| 4,083,946 | 4/1978 | Schurr et al. | 55/71 X |
| 4,243,650 | 1/1981 | Tsao | 55/71 X |
| 4,349,422 | 9/1982 | Steward, Jr. | 55/71 X |
| 4,385,964 | 5/1983 | Johnson et al. | 55/71 X |
| 4,454,104 | 6/1984 | Griesshammer et al. | 55/71 X |
| 4,455,288 | 6/1984 | Salter et al. | 423/613 X |

FOREIGN PATENT DOCUMENTS

| 567185 | 12/1958 | Canada | 55/71 |
|---|---|---|---|
| 866002 | 4/1961 | United Kingdom | 55/71 |

Primary Examiner—Robert Spitzer
Attorney, Agent, or Firm—William G. Addison; John P. Ward

[57] ABSTRACT

In the manufacture of particulated metal oxides by the vapor phase oxidation of volatile metal halides, hot gaseous effluent streams are produced which, after separation of the desired particulated metal oxide therefrom, contain residual amounts of the particulated metal oxide as well as unreacted, volatile metal halide and halogen gas. The method of this invention provides for the recovery of these materials, individually, through a succession of contacting and separating steps utilizing a recycle stream of previously recovered, unreacted, liquid metal halide. Utilization of the recycle stream of metal halide provides for both evaporative cooling of the hot gaseous effluent stream to permit recovery of the residual particulated metal oxide therein and scrubbing of the resulting off-gas to recover the unreacted volatile metal halide therein as a liquid and provide a gas phase containing the by-product halogen gas. The recovered unreacted volatile metal halide liquid constitutes the recycle stream of liquid metal halide used in the process. The gas phase is subjected to a further scrubbing to separate and recover therefrom any remaining unreacted, volatile metal halide.

10 Claims, 1 Drawing Figure

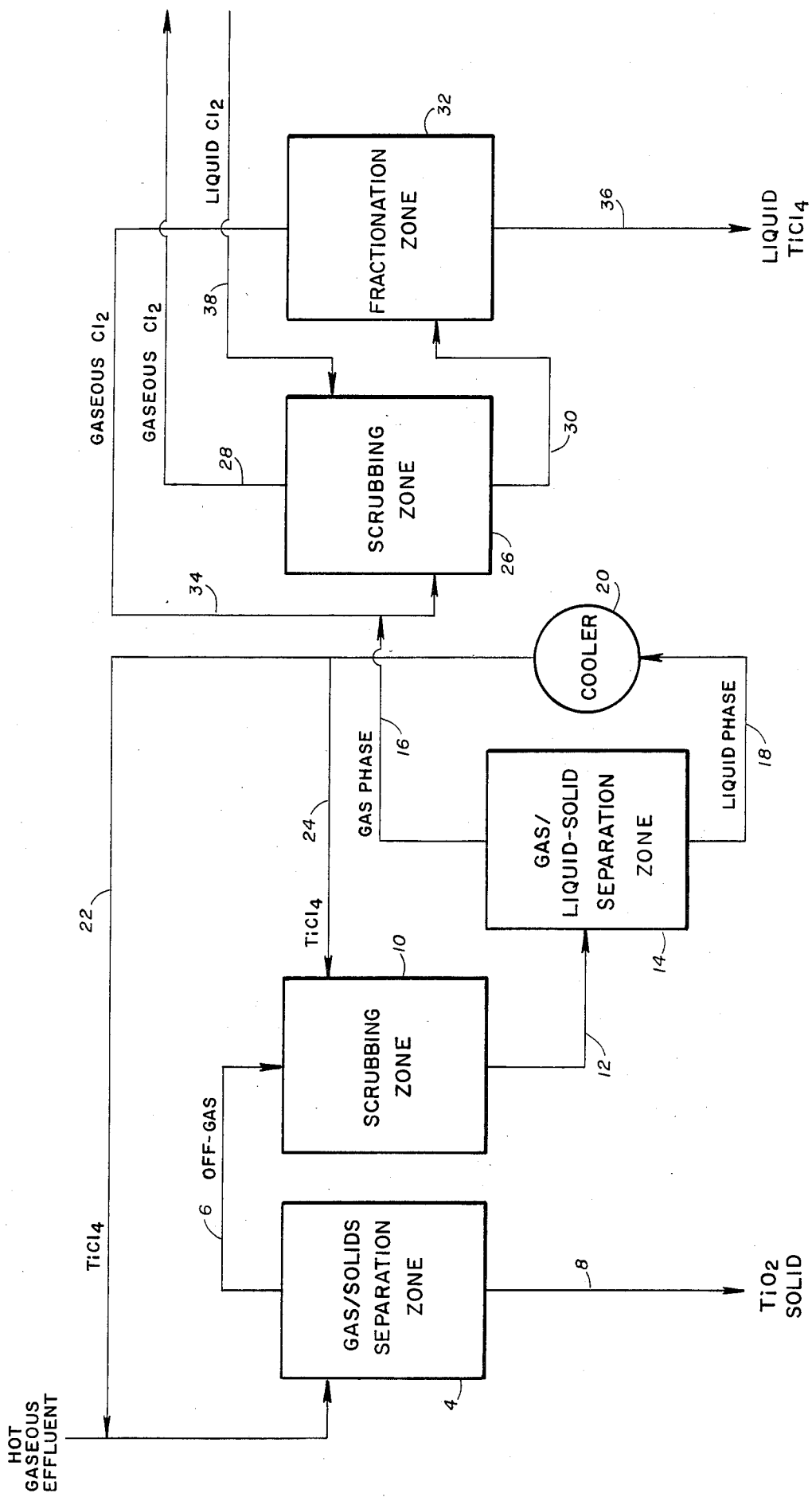

METHOD FOR PROCESSING GASEOUS EFFLUENT STREAMS RECOVERED FROM THE VAPOR PHASE OXIDATION OF METAL HALIDES

FIELD OF THE INVENTION

The present invention relates to a method for processing hot gaseous effluent streams resulting from the vapor phase oxidation of volatile metal halides to produce particulated metal oxides. More particularly, this invention relates to a method for separating and recovering residual particulated metal oxides, unreacted volatile metal halides and halogen gases contained in such effluent streams subsequent to removal from such streams of the bulk of the desired particulated metal oxide. Most particularly, this invention relates to a method for separating and recovering residual pigmentary titanium dioxide, unreacted titanium tetrachloride and chlorine contained in the hot gaseous effluent stream resulting from the vapor phase oxidation of titanium tetrachloride.

BACKGROUND OF THE INVENTION

It is known that particulated metal oxides may be produced by oxidizing volatile metal halides in a vaporized state. In such vapor phase oxidation processes, a volatilized metal halide is caused to be reacted with oxygen, air or like oxygen-containing gas to yield the corresponding metal oxide and gaseous halogen. Exemplary of such processes are those involving the vapor phase oxidation of titanium tetrachloride to produce pigmentary titanium dioxide and by-product chlorine. Generally, the economics of these vapor phase oxidation processes are such that, when operated on a commercial scale, it is desirable to recover the by-product halogen gas produced and contained in an off-gas effluent stream for use in other stages of the process such as, for example, the halogenation stage of the process.

In the vapor phase oxidation of titanium tetrachloride to produce pigmentary titanium dioxide, one method that is employed to recover the by-product chlorine gas is to first quench the hot, gaseous effluent stream from the oxidation stage, after separation of the pigmentary titanium dioxide therefrom, with a cool stream of recycle chlorine gas. The quenched effluent stream then is filtered, to remove any remaining particulate titanium dioxide suspended therein, and scrubbed with a sulfuric acid solution to remove the unreacted titanium tetrachloride. The resulting scrubbed effluent stream, containing chlorine and oxygen gases, then is compressed and cooled for reuse. Generally, the recovered by-product chlorine gas is employed, in part, to quench further gaseous effluent from the vapor phase oxidation reaction and, in part, to provide a source of chlorine for the preparation of titanium tetrachloride feed for use in the process. One drawback to this method is that the unreacted titanium tetrachloride removed by scrubbing of the gaseous effluent with sulfuric acid is permanently lost.

Another method for recovering and reusing by-product chlorine gas from a gaseous effluent resulting from the vapor phase oxidation of titanium tetrachloride to produce pigmentary titanium dioxide is disclosed in U.S. Pat. No. 3,526,477. According to this patent, the method involves selectively absorbing chlorine from a part of reaction off-gases with titanium tetrachloride to obtain a solution of chlorine dissolved in said titanium tetrachloride. A portion of this solution is recovered and recycled to a chlorination zone. The remainder of the solution then is stripped to recover the dissolved chlorine by itself which then is recycled to the chlorination zone. One advantage of this process is disclosed to be that a portion of the off-gases from the vapor phase oxidation reaction, which off-gases contain oxygen, can be added directly to a chlorination zone since the mixture of titanium tetrachloride and dissolved chlorine gas has an endothermic effect on the chlorination reaction. Other processes have been proposed for the recovery of the chlorine contained in the gaseous effluents resulting from the vapor phase oxidation of titanium tetrachloride, including, for example, U.S. Pat. Nos. 3,526,477 and 3,650,695.

SUMMARY OF THE INVENTION

A simple and economical novel method now has been discovered which provides not only for the recovery of by-product halogen gases resulting from the oxidation of a volatile metal halide in a vaporous state but also for the recovery of the residual particulate metal oxide and unreacted volatile metal halide contained in the hot gaseous effluent stream from said oxidation reaction. Thus, in accordance with the present invention, there is provided a method for processing a hot gaseous effluent stream recovered from the vapor phase oxidation reaction of a volatile metal halide with oxygen, air or like oxygen-containing gas to separate and recover therefrom the individual constituents therein.

The method comprises first cooling the hot gaseous effluent stream by contacting said effluent stream with a first quantity of a recycle stream of previously recovered unreacted volatile metal halide. The cooled effluent stream then is subjected to separation to recover at least a major portion of the residual amount of particulate metal oxide in this stream and to provide an off-gas stream containing any remaining portion of the particulate metal oxide. This off-gas stream further contains unreacted volatile metal halide, the added first quantity of recycle volatile metal halide, which is vaporized when contacted with the original hot gaseous effluent stream, and by-product halogen gas derived from said volatile metal halide.

The off-gas is recovered and contacted with a second quantity of the recycle stream of previously recovered unreacted volatile metal halide to scrub any remaining minor portion of particulate metal oxide therefrom and to provide a mixture comprising a liquid phase and a gas phase. The liquid phase contains the major portion of the unreacted volatile metal halide, including the unreacted volatile metal halide from the original hot gaseous effluent stream as well as the first and second quantities of the previously recovered unreacted volatile metal halide contacted with said hot gaseous effluent stream and off-gas stream, respectively. The gaseous phase contains the by-product halogen gas and the remaining minor portion of unreacted vaporous metal halide.

The mixture of liquid and gas phases then is separated. The liquid phase provides the first and second quantities of recycle stream of unreacted volatile metal halide employed in the method. The gaseous phase is recovered and subjected to separation to recover the by-product halogen gas therein and the remaining minor portion of unreacted vaporous metal halide in a condensed state.

In general, the present invention can be used in the processing of hot gaseous effluent streams generated by any volatile metal halide capable of reacting, in a vaporous state, with oxygen, air or like oxygen-containing gas to yield the corresponding metal oxide. Representative, but non-limiting, examples of metal halides capable of undergoing such reaction include the chlorides, bromides and fluorides of aluminum, zinc, antimony, zirconium, chrominum, iron, nickel, titanium, cobalt, molybdenum, silicon and the like. However, the present invention is particularly useful in the processing of the hot gaseous effluent stream generated by the vapor phase oxidation of titanium tetrachloride. To facilitate the description and understanding of the method comprising the invention, specific reference hereinafter will be made to the processing of a hot gaseous effluent stream recovered from the vapor phase oxidation of titanium tetrachloride to produce pigmentary titanium dioxide.

BRIEF DESCRIPTION OF THE DRAWING

The single FIGURE represents a schematic illustration of a preferred embodiment of the method comprising the present invention.

DETAILED DESCRIPTION OF THE INVENTION

Broadly, the process of the present invention comprises a series of successive steps or stages wherein a hot gaseous effluent stream, recovered from the vapor phase oxidation of, for example, titanium tetrachloride to produce pigmentary titanium dioxide and containing a residual amount of pigmentary titanium dioxide, unreacted titanium tetrachloride vapors and chlorine gas, can be more efficiently separated into its individual constituent parts.

More particularly, the present invention comprises a process wherein the above described hot gaseous effluent is contacted with a first quantity of a recycle stream of previously recovered unreacted liquid titanium tetrachloride which stream may contain small amounts of residual solid titanium dioxide particles. This contact results in evaporation or vaporization of the first quantity of the recycle stream and a concomitant substantial cooling of the hot gaseous effluent stream. The resultant cooled effluent then is subjected to a separation step wherein at least a major proportion, if not all, of the residual solid titanium dioxide particles suspended in the effluent, including any residual solid titanium dioxide particles, included in the cool, recycle titanium tetrachloride stream contacted with the gaseous effluent, is separated from said gaseous effluent and recovered.

The cooled gaseous effluent (hereinafter referred to as the "off-gas") remaining after separation of at least a major proportion, if not all, of the residual solid titanium dioxide particles therein then is recovered and contacted with a second quantity of the above described liquid titanium tetrachloride recycle stream. The purpose for contacting this off-gas with this second quantity of liquid titanium tetrachloride recycle stream is to further cool the off-gas and condense and remove a major proportion of the vaporous titanium tetrachloride in said off-gas, including not only the unreacted titanium tetrachloride from the vapor phase oxidation reaction but also the titanium tetrachloride absorbed by the original hot gaseous effluent when the latter is contacted with the first quantity of liquid titanium tetrachloride recycle stream. Contact of the off-gas with the second quantity of liquid titanium tetrachloride recycle stream also removes the remaining proportion, if any, of residual solid titanium dioxide particles which have remained suspended in this off-gas during the above disclosed separation step.

The mixture resulting from the contact of the off-gas recovered from the first separation step with the second quantity of liquid titanium tetrachloride recycle stream contains both a gaseous phase and a liquid phase. This two-phase mixture is subjected to a second separation step wherein the liquid phase containing titanium tetrachloride and the remaining minor proportion, if any, of residual solid titanium dioxide particles is recovered and employed as the liquid titanium tetrachloride recycle stream for contacting with the hot gaseous effluent and off-gas described herein.

The gaseous phase recovered from this second separation step contains a remaining minor proportion of vaporous titanium tetrachloride and noncondensed chlorine and oxygen gases. This gaseous phase is combined with a previously recovered chlorine gas stream and subjected to a final scrubbing step to condense and remove the remaining minor proportion of titanium tetrachloride as a liquid and to recover a final gaseous mixture containing chlorine and oxygen gases. In general, this final scrubbing step will be carried out employing a recycle stream of liquid chlorine recovered through the utilization of the process of this invention. The recovered minor proportion of liquid titanium tetrachloride then is subjected to a fractionation step to remove and recover the chlorine absorbed therein, which chlorine is combined with the gaseous phase introduced in the scrubbing step. The liquid titanium tetrachloride recovered from this fractionation step then is either recycled back to and combined with the liquid titanium tetrachloride recovered in the second separation step or purified and used in the vapor phase oxidation reaction or both.

Referring now to the single FIGURE, a hot gaseous effluent resulting from the vapor phase oxidation of titanium tetrachloride in a reaction zone (not shown) and from which at least about 90 weight percent of the solid particulated titanium dioxide product produced in said zone has been removed in a primary separation zone (not shown) is introduced through conduit 2 into gas/solids separation zone 4. Before introduction of the hot gaseous effluent flowing in conduit 2 to the gas/solids separation zone 4, a cool, e.g., 100° F., recycle stream of previously recovered unreacted liquid titanium tetrachloride is introduced into conduit 2 by way of conduit 22 to contact the hot gaseous effluent flowing in conduit 2. Contact of the cool recycle stream of previously recovered unreacted liquid titanium tetrachloride with the hot gaseous effluent stream in conduit 2 results in evaporation of vaporization of the recycle stream and a concomitant cooling of the hot gaseous effluent stream. The extent of cooling will depend on the amount of the recycle stream contacted with the hot, gaseous effluent stream. In general, however, such amount will be a quantity sufficient to cool said hot gaseous effluent from a temperature of about 1,000° F. to a temperature of above about the titanium tetrachloride dew point of said gaseous effluent, i.e., a temperature of about 200° F. to about 300° F. The cooled gaseous effluent in gas/solids separation zone 4 then is subjected to separation to recover a major proportion, if not all, of the residual solid titanium dioxide particles suspended in said cooled gaseous effluent. The residual solid particulate titanium dioxide then is removed from gas/solids separation zone 4 through conduit 8 and is conveyed through said conduit 8 for further handling.

The cooled gaseous effluent or off-gas recovered from said gas/solids separation zone 4, which off-gas contains a minor proportion, if any, of residual solid particulated titanium dioxide, titanium tetrachloride vapors and chlorine and oxygen gases, then is introduced by way of conduit 6 into scrubbing zone 10. In scrubbing zone 10, said off-gas is contacted with a second quantity of the above described liquid titanium tetrachloride recycle stream introduced into scrubbing zone 10 through conduit 24 to further cool said off-gas. The contact of this second quantity of liquid titanium tetrachloride recycle stream with the off-gas from gas/solids separation zone 4 in scrubbing zone 10 results in the condensation and removal from said off-gas of a major proportion of the vaporous titanium tetrachloride therein as well as the removal from said off-gas of the remaining minor proportion of the residual solid particulated titanium dioxide suspended therein.

The mixture resulting from the contacting of the off-gas recovered from gas/solids separation zone 4 with the second quantity of liquid titanium tetrachloride recycle stream in scrubbing zone 10 contains both a gaseous phase and a liquid phase. This mixture is removed from scrubbing zone 10 and conveyed to gas/liquid-solids separation zone 14 by means of conduit 12.

In gas/liquid-solids separation zone 14, the gas and liquid-solids phases are separated. The liquid-solids phase, containing the remaining minor proportion, if any, of residual solid particulate titanium dioxide, comprises the condensed unreacted titanium tetrachloride from the original hot gaseous effluent introduced into gas/solids separation zone 4 as well as the titanium tetrachloride employed as the first and second titanium tetrachloride recycle streams. After separation of the gaseous and liquid-solids phases in gas/liquid-solids separation zone 14, the liquid phase is removed therefrom through conduit 18 to cooler 20 wherein said liquid-solids phase is cooled to a temperature in the range of from about ambient temperature to about 200° F. Generally, said liquid-solids phase will be cooled to a temperature in the range of from about 100° F. to about 150° F. This cooled liquid-solids phase, which constitutes the titanium tetrachloride recycle stream employed in the process, is removed from said cooler 20 by means of conduit 22. A portion of the cooled liquid titanium tetrachloride recycle stream then is removed from conduit 22 by means of conduit 24. The portion of titanium tetrachloride removed from conduit 22 by means of conduit 24 comprises the second quantity of titanium tetrachloride recycle stream which is contacted with the off-gas introduced into scrubbing zone 10 by way of conduit 6 communicating with gas/solids separation zone 4. The remainder of the cooled liquid titanium tetrachloride recycle stream which is in conduit 22 comprises the first quantity of liquid titanium tetrachloride recycle stream. As disclosed hereinabove, this first quantity of cooled liquid titanium tetrachloride recycle stream is conveyed through conduit 22 to conduit 2 wherein said recycle stream is contacted with the hot gaseous effluent stream from the primary separation zone (not shown) to effect cooling of said effluent stream through evaporation or vaporization of said recycle stream prior to the introduction of said effluent stream into gas/solids separation zone 4.

Referring once again to the single Figure, the gaseous phase recovered in gaseous/liquid-solids separation zone 14 contains a remaining minor proportion of vaporous titanium tetrachloride and the noncondensed chlorine and oxygen gases. This gaseous phase is withdrawn from said gaseous/liquid-solids separation zone 14 by means of conduit 16 and introduced into conduit 34 containing a gaseous chlorine stream from fractionation zone 32 described hereinbelow. In conduit 34, the gaseous phase recovered from gaseous/liquid-solids separation zone 14 and the gaseous chlorine stream from fractionation zone 32 are combined to form a gaseous mixture which then is introduced into scrubbing zone 26. In scrubbing zone 26, the gaseous mixture introduced thereto through conduit 34 is contacted with a countercurrent flowing stream of cold liquid chlorine introduced to scrubbing zone 26 through conduit 38. Such liquid chlorine stream may be supplied from an independent outside source or may comprise liquid chlorine recovered through refrigeration and compression (by means not shown) of a previously recovered mixture of chlorine from scrubbing zone 26. On contact of the gaseous phase introduced into scrubbing zone 26 through conduit 34 with the countercurrent flowing stream of liquid chlorine introduced into scrubbing zone 26 through conduit 38, the remaining minor proportion of vaporous titanium tetrachloride is absorbed in said liquid chlorine and removed from said scrubbing zone 26 through conduit 30, wherein it is conveyed to fractionation zone 32. The gaseous effluent recovered from scrubbing zone 26 and comprising essentially of chlorine gas then is conveyed to refrigeration and compression means (not shown) through conduit 28 for liquefaction and reuse.

The remaining minor proportion of condensed titanium tetrachloride recovered in scrubbing zone 26, together with the chlorine in which it is dissolved, is removed therefrom and conveyed to and introduced into fractionation zone 32 through conduit 30. Within fractionation zone 32, the condensed titanium tetrachloride is heated to a temperature sufficient to separate from said condensed titanium tetrachloride the chlorine in which it is dissolved and to recover a stream of liquid titanium tetrachloride. The chlorine separated from the condensed titanium tetrachloride in fractionation zone 32 is withdrawn from said fractionation zone 32 by way of conduit 34. The chlorine in this conduit 34, which is in a gaseous state, then is combined with the gaseous phase from conduit 16, said conduits 16 and 34 being in communication with each other, and the combination introduced into scrubbing zone 26 to continue the process. The stream of liquid titanium tetrachloride recovered in said fractionation zone 32 is removed therefrom through conduit 36 and, as disclosed hereinabove, either recycled (by means not shown) back to and combined with the liquid titanium tetrachloride recovered in gas/liquid-solids separation zone 14 or purified (by means not shown) and employed in the vapor phase oxidation reaction or both.

While the method of the present invention has been described in detail with respect to that which at present is considered to be the preferred embodiments thereof, it is to be understood that changes and modifications can be made to the method without departing from the spirit and scope of the invention as described above and as defined in the following claims.

What is claimed is:

1. A method for processing a hot gaseous effluent stream recovered from a vapor phase oxidation of a volatile metal halide to produce a particulate metal oxide thereof, said effluent stream containing a residual amount of said particulate metal oxide suspended therein, unreacted volatile metal halide vapors and by-product halogen gas comprising the steps of:

contacting said hot, gaseous effluent stream with a first quantity of a recycle stream of cool, volatile metal halide, said contact causing evaporation of said first quantity of said recycle stream of cool, volatile metal halide to thereby effect a cooling of said hot gaseous effluent stream to provide a lower temperature gaseous effluent stream;

subjecting said lower temperature gaseous effluent stream to separation to effect removal of at least a major portion of the residual amount of said particulate metal oxide suspended therein and provide an off-gas stream containing any remaining minor portion of the residual amount of said particulate oxide, the unreacted volatile metal halide vapors and by-product halogen gas;

contacting the off-gas stream with a second quantity of said recycle stream of cool, volatile metal halide to effect a further cooling of said off-gas stream and thereby form a mixture, said mixture comprising a liquid phase and a gas phase, wherein said liquid phase contains said second quantity of the recycle stream of cool, volatile metal halide, a major portion of condensed volatile mtal halide vapors and any remaining minor portion of the residual amount of particulate metal oxide and wherein said gaseous phase contains any remaining minor portion of the volatile metal halide vapors and by-product halogen gas;

separating the liquid phase and gaseous phase from said mixture thereof, wherein said liquid phase is cooled and comprises the recycle stream of cool, volatile metal halide for contacting with said hot gaseous effluent stream and said off-gas stream;

contacting said gaseous phase with a stream of cold liquid halogen to absorb the remaining minor portion of volatile metal halide vapors therein and to provide a gaseous phase of by-product halogen gas; and recovering from said stream of cold liquid halogen the remaining minor portion of the volatile metal halide vapors absorbed therein as a separate volatile metal halide liquid phase.

2. The method of claim 1 wherein said hot gaseous effluent stream is a hot gaseous effluent stream recovered from the vapor phase oxidation of at least one volatile metal halide comprised of metal and halogen atoms in which said metal is selected from the group consisting of titanium, silicon and iron and wherein said halogen is selected from the group consisting of chlorine, bromine and iodine.

3. The method of claim 2 wherein said volatile metal halide is titanium tetrachloride.

4. The method of claim 3 wherein said hot gaseous effluent stream contains a residual amount of particulate titanium dioxide, unreacted titanium tetrachloride and by-product chlorine gas.

5. The method of claim 3 wherein said recycle stream comprises previously recovered, unreacted titanium tetrachloride.

6. The method of claim 5 wherein said recycle stream of previously recovered, unreacted titanium tetrachloride is at a temperature ranging from about ambient temperature to about 200° F.

7. The method of claim 6 wherein said first quantity of said recycle stream contacted with said hot gaseous effluent stream is an amount sufficient to cool said hot gaseous effluent stream, having a temperature of about 1,000° F., and provide a lower temperature gaseous effluent stream having a temperature of above about the dew point of the titanium tetrachloride in said lower temperature effluent stream.

8. A method for processing a hot gaseous effluent stream recovered from a vapor phase oxidation of titanium tetrachloride to produce pigmentary titanium dioxide, said effluent stream containing a residual amount of solid, pigmentary titanium dioxide suspended therein, titanium tetrachloride vapors and chloride gas comprising the steps of:

contacting said hot, gaseous effluent stream with a first quantity of a recycle stream of cool, previously recovered, unreacted titanium tetrachloride, said contact causing evaporation of said first quantity of said recycle stream of cool titanium tetrachloride to thereby effect a cooling of said hot gaseous effluent stream to provide a lower temperature gaseous effluent stream;

subjecting said lower temperature gaseous effluent stream to separation to effect removal of at least a major portion of the residual amount of solid, pigmentary titanium dioxide suspended therein and provide an off-gas stream containing any remaining minor portion of the residual amount of solid, pigmentary titanium dioxide, the titanium tetrachloride vapors and chlorine gas;

contacting the off-gas stream with a second quantity of said recycle stream of cool titanium tetrachloride to form a mixture, said mixture comprising a liquid phase and a gas phase, wherein said liquid phase contains said second quantity of the recycle stream of cool titanium tetrachloride, a major portion of condensed titanium tetrachloride, a major portion of condensed titanium tetrachloride vapors and any remaining portion of the residual amount of solid, pigmentary titanium dioxide and wherein said gaseous phase contains any remaining minor portion of the titanium tetrachloride vapors and chlorine gas;

separating the liquid phase and gaseous phase from said mixture thereof, wherein said liquid phase is cooled and comprises the recycle stream of cool titanium tetrachloride for contacting with said hot gaseous effluent stream and said off-gas stream;

contacting said gaseous phase with a stream of cold, liquid chlorine to absorb the remaining minor portion of volatile titanium tetrachloride vapors therein and to provide a gaseous phase of by-product chlorine gas; and recovering from said stream of cold, liquid chlorine the remaining minor portion of the titanium tetrachloride vapors absorbed therein as a separate titanium tetrachloride liquid phase.

9. The method of claim 8 wherein said recycle stream of cool, previously recovered, unreacted titanium tetrachloride is at a temperature ranging from about ambient temperature to about 200° F.

10. The method of claim 9 wherein said recycle stream contacted with said hot gaseous effluent stream is an amount sufficient to cool said hot gaseous effluent stream, having a temperature of about 1,000° F., and provide a lower temperature gaseous effluent stream having a temperature of above about the dew point of the titanium tetrachloride in said lower temperature effluent stream.

* * * * *